United States Patent Office 2,880,241
Patented Mar. 31, 1959

2,880,241

CARBONYLATION SYNTHESIS REACTION

Vincent L. Hughes, Clark Township, Union County, N.J., assignor to Esso Research and Engineering Company, a corporation of Delaware No Drawing. Application January 11, 1956
Serial No. 558,409

3 Claims. (Cl. 260—604)

The present invention relates to the preparation of oxygenated organic compounds by the reaction of carbon monoxide and hydrogen with an olefinic compound with distinctive carbonylation catalysis. More specifically, the present invention relates to the discovery of how to employ rhodium and rhodium compounds as highly effective carbonylation catalysts.

The present invention also relates to the discovery of new compounds synthesized by the instant process and which will be defined in greater detail hereinafter.

It is well known in the art that certain oxygenated organic compounds may be synthesized from olefins by a reaction with carbon monoxide and hydrogen in the presence of catalysts containing cobalt under limited conditions known as oxo conditions.

It has now been discovered that rhodium-containing catalysts are especially effective for oxygenating olefins under certain conditions and that compared to the conventional cobalt catalysts yield unexpected superior results. The rate of reaction over the cobalt catalyst is markedly higher at equivalent catalyst concentrations, thus permitting the use of lower operating temperatures than the so-called oxo process employs. Moreover, the rhodium catalyst permits a more selective and a different kind of carbonylation. For example, dicyclopentadiene can be oxygenated at 100° C. using a rhodium-containing catalyst to form the unsaturated aldehyde whereas said unsaturated aldehyde cannot be obtained employing cobalt.

Rhodium-containing catalysts are effective tools for controlling the isomer distribution of aldehyde and/or alcohol. Normally the cobalt catalyzed oxo reaction produces a mixture of two or more isomers. In the case of butene-1, the following reaction takes place:

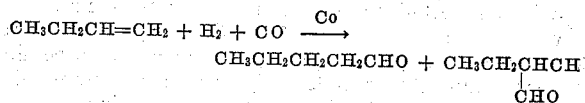

Rhodium catalyzed carbonylation at low temperatures, such as 60–120° C. permits the production of predominantly (75 to 90%) branched isomer. This result cannot be accomplished with a cobalt catalyst.

Minor amounts of rhodium-containing catalyst may be used as a co-catalyst or promoter with major amounts of a cobalt catalyst to effect high reaction rate and product distribution, such as those obtainable by employing a rhodium-containing catalyst.

The olefinic reactants which come within the scope of the present process may comprise pure olefin or hydrocarbon mixtures containing olefins. These olefins may be broadly classified into two groups, the non-conjugated diolefins and the mono-olefins. Representative of the non-conjugated diolefins are dicyclopentadiene, the lower alkyl substituted dicylopentadienes, the terpenes and vinylcyclohexene. The mono-olefins are represented by straight and branched chain compounds such as ethylene, propylene, butylene and higher olefins such as dodecene, octadecene, etc. Cyclic olefins such as cyclohexene, styrene as well as olefin polymers such as di- and tri-isobutylene and hexene are also useful in the present process. In general, monomeric olefins having 2 to 20 carbon atoms in the molecule and polymers thereof may be used.

The synthesis gas mixture containing hydrogen and carbon monoxide may be obtained from any conventional source such as carbonaceous solids or gases in any manner known in the art and in any desired ratio of hydrogen to carbon monoxide. For practical reasons the ratio of hydrogen to carbon monoxide which may be employed will generally range from about 0.5:1 to 10:1. Generally low hydrogen to carbon monoxide ratios (0.5–1.5) are preferred when aldehydes are the desired products; however, higher ratios (e.g. 2–4) are used when high alcohol conversions are desired. The reaction of the olefins with hydrogen and carbon monoxide is conducted at pressures ranging from 1,000 to 10,000 p.s.i.g. and the temperature of the reaction is generally within the range of 60°–240° C. Preferred temperatures and pressures are 80–190° C. and 1000–4500 p.s.i.g.

In order for rhodium to catalyze the reaction effectively, it is essential that it be present in the form of a soluble product during the reaction. Elemental rhodium, inorganic or organic rhodium salts are examples of those substances which will form a soluble rhodium compound under the reaction conditions of the present process. The rhodium may be in the form of a carbonyl which would include any rhodium carbonyl, hydrocarbonyl mixtures and complex compounds thereof. Accordingly the catalyst of this invention may be added as metallic rhodium, a rhodium oxide, salt or any rhodium-containing composition of matter which can be maintained in the form of a soluble rhodium compound under said reaction conditions. More specifically rhodium dioxide, sesquioxide, halide, nitrate, sulfate, sulfite and salts of organic acids such as oleic, stearic, etc., may be employed. The preferred rhodium compounds for this process are the above noted oxides and the chloride.

Rhodium oxides and chlorides are especially desirable since they are easily converted to the soluble form, and they represent the most effective form of rhodium from the standpoint of permitting fast reaction rates, good yields and low bottoms.

Rhodium carbonyls are usable and may be preformed in any known manner, to a form such as a solid crystalline material or in solution with an organic solvent, e.g., hexane, aldehyde, olefin, alcohol, etc., and either may be used in the reaction mixture as the catalyst. Rhodium carbonyl may be made by any of the various methods known in the art among which, direct union of carbon monoxide with metallic rhodium or a rhodium salt at high pressures, is effective. Rhodium carbonyl takes several forms, e.g. $Rh_2(CO)_8$, $(Rh(CO)_3)_n$, $(Rh_4(CO)_{11})_n$ and $Rh(CO_4)_4H$. The various forms of rhodium carbonyl as well as mixtures thereof are suitable catalytic materials for the present reaction. However, some are more desirable than others.

Also, any of the above rhodium-containing catalysts may be supported on conventional carriers such s alumina, kieselguhr, silica, silica-alumina or any other carrier inert to the reaction. The proportion of rhodium or rhodium compound to the carrier is not critical since the catalytic effect is due solely to the amount of rhodium per unit of olefin feed. However, for practical considerations the rhodium compound when on a support should comprise from about 1% to 40% by weight based on rhodium to the carrier, with about 5% being preferred.

The catalyst concentration may vary over a range of from about 0.002 to 20.0 mole percent based on the rhodium to the olefin, but the preferred range is 0.01–5 mole percent. The amount of catalyst employed will depend mainly on the temperature and the desired results. Generally, higher operating temperatures require less catalyst and result in the formation of more normal than branched isomer with increased bottoms yields. Conversely, lower temperatures require more catalyst which results in the production of branched chain isomer and low bottom yields.

The rhodium catalyzed process of the present invention affords improved yields of desirable products and at increased reaction rates as will appear more clearly from the following specific examples and data.

EXAMPLE 1

5 moles of butene-1 were placed in a high pressure reactor chilled with Dry Ice and 1.8 gms. of reduced rhodium metal on an alumina support was added. This corresponded to 0.017 mole percent of rhodium per mole of the olefin feed. The weight percent of rhodium to the alumina equaled 5%. A mixture of carbon monoxide and hydrogen (1:1) was pressured at 2200 p.s.i.g. into the reactor and the temperature raised to 150° C., the pressure increasing to 3200 p.s.i.g. The reaction took up about ⅓ of the total gas in the first half hour. Rhodium carbonyl was formed during the reaction as evidenced by its characteristic odor and by infra-red spectra qualitative analysis. Chemical analysis showed 77% of the product was aldehyde with 95% of the olefin having reacted. The product included acetals and a small amount of free alcohol.

The following table illustrates the increase in reaction rate and the usability of lower temperatures when employing a rhodium catalyst of this invention in a carbonylation process with butene-1 as the olefin feed. The carbon monoxide/hydrogen ratio employed was 1:1.

Table I

| Catalyst | Mole Percent Rh or Co based on Feed | Temp., °C. | Press., P.s.i.g. | Relative Reaction Rate [1] |
| --- | --- | --- | --- | --- |
| Rhodium sesquioxide | 0.05 | 100 | 3,500 | 1. |
| Cobalt oleate | 0.05 | 100 | 3,500 | No detectable reaction. |
| Rhodium sesquioxide | 0.05 | 125 | 3,500 | 4. |
| Cobalt oleate | 0.05 | 125 | 3,500 | 0.4. |
| Rhodium sesquioxide | 0.05 | 150 | 3,500 | 10. |
| Cobalt oleate | 0.05 | 150 | 3,500 | 0.6. |

[1] Relative reaction rate: These figures are based on the unit 1 which was arbitrarily given to the process employing rhodium sesquioxide at 100° C.

This example indicates that under similar conditions the rhodium-containing catalyst yields a reaction rate many times faster than the cobalt catalyst. For example, at 100° C., the reaction rate using a rhodium-containing catalyst was three times as fast as when using a cobalt catalyst at 150° C. The cobalt catalysts in this example are in the form of the fatty acid salt since this form of cobalt is considered by the prior art to be one of the most effective. The oxide of cobalt alone is considerably less active than the cobalt salt used in this example. Unexpectedly, the oxides of rhodium have been found to be exceptionally active.

It is further seen from Table I that the cobalt salt at 100° C. was incapable of catalyzing the present carbonylation reaction for the above catalyst concentration, whereas the rhodium oxide causes a fast reaction at this and even lower temperatures.

One disadvantage of the cobalt catalyst has been the large amount of higher boiling materials (bottoms) formed by side reactions of the aldehydes at conventional operating temperatures. Table II demonstrates the increased yields of aldehyde and decreased yields of undesirable bottoms obtained when using rhodium catalysis as compared to cobalt catalysis.

Table II

[$CO/H_2 = 1:1$]

| Catalyst | Mole Percent Rh or Co based on Feed | Olefin Feed | Temp., °C. | Press. P.s.i.g. | Percent Aldehyde | Percent Bottoms |
| --- | --- | --- | --- | --- | --- | --- |
| Cobalt oleate | 0.05 | Butene-1 | 150 | 3,500 | 68 | 29 |
| Rhodium sesquioxide | 0.05 | Butene-1 | 100 | 3,500 | 92 | 8 |

Rhodium chloride, at a catalyst concentration of 0.05 mole percent rhodium gave a reaction, comparable to the rhodium sesquioxide run described in Table II. The product yield and distribution were essentially the same.

EXAMPLE 2

This example illustrates the preformation of soluble rhodium compounds in a hexane solution and use thereof in the present process.

0.05 mole of rhodium sesquioxide were placed in a high pressure reactor with 10 mls. of hexane. The mixture was subjected to conditions of 150° C., 3500 lbs. total pressure and 1:1 ratio of carbon monoxide to hydrogen for a period of 2 hours. A clear solution was formed. This solution was added to 100 liquid ccs. butene-1 and the mixture heated to 105° C. at 3500 p.s.i.g. with a 1:1 gas ratio. 99% conversion to oxygenated products took place.

In the present process, rhodium may be recovered in a direct single step operation, as a catalytically active product. The product recovered from the present process will contain dissolved rhodium therein. The rhodium may be recovered from the product by treatment with water at elevated temperatures whereupon the rhodium components precipitate out in the aqueous phase generally as a mixture of metallic rhodium and oxides thereof. Easy conversion of the precipitated rhodium to the active oxide may be accomplished by any well-known oxidation technique such as treatment with air at elevated temperatures, e.g., 400° C. Any rhodium remaining in the product in the form of a fine suspension after treatment with water may be recovered by flashing off the product. In the process of removing rhodium from the product or derhodiumizing, it is generally preferred to add from about 5 to 40% by volume water at 120°–200° C. Temperatures over about 200° C. are feasible but not desirable since high temperatures may cause condensation of aldehydes to give undesirable side products. Temperatures as low as 80° C. are also usable; however, to improve the rate of precipitation temperatures above 120° C. have been found to be advantageous. Water may be added in amounts up to one volume and more per volume of aldehyde product; however, large amounts are not desirable since excess water is difficult to handle.

EXAMPLE 3

500 ccs. of liquefied butene-1 was charged into a 3-liter reactor with 0.3 gm. rhodium sesquioxide and $CO/H_2$ (1:1) were pressured in at 2000 p.s.i.g. The temperature was then raised to 150° C. and the reaction began immediately. When the reaction ceased as indicated by the gas uptake, the reactor was cooled, the pressure reduced to atmospheric and 150 ccs. water were charged to the product. The temperature was then raised to 180° C. with the vessel sealed for two hours and then cooled. The two phases which formed were filtered and the aqueous phase was treated with a few drops of concentrated sodium hydroxide to insure complete removal of rhodium.

The filtered material (rhodium) was dried and recycled to the reactor which was then charged with 500 ccs. of butene-1 and the above procedure repeated. At 150° C. the reaction proceeded smoothly and in the same manner as the first run.

EXAMPLE 4

550 ccs. of $C_7$ olefin obtained by copolymerizing butene-1 and propylene, and 0.31 gm. $Rh_2O_3$ were added to a reactor and $CO/H_2$ (1:1) were pressured in at 500 p.s.i.g. The temperature and pressure were then raised to 175° C. and 3500 p.s.i.g. Reaction began immediately and within twenty minutes most of the reaction was completed. Analysis of the product indicated a conversion of about 85% about >80% of which was oxygenated compounds and the rest paraffins. Employing cobalt oleate under similar conditions the reaction took ninety minutes to complete and the product analysis was similar to that obtained with the rhodium catalysis of this example.

EXAMPLE 5

Butene-1 was oxonated as above with 0.3 gm. rhodium oxide at 210° C. and $H_2/CO$ (1:1) at 5200 p.s.i.g. The reaction was completed in one-half hour. After cooling and venting the reactor, the material was hydrogenated over a nickel catalyst and the water white product was distilled. 65% of the product boiled in the range of the amyl alcohols present.

EXAMPLE 6

This example further illustrates the effect of rhodium on selective carbonylation.

1.44 moles of dicyclopentadiene were placed in a high pressure reactor and 0.05 mole percent of $Rh_2O_3$ per mole of the diolefin was added. Three volumes of a mixed hexane/volume of olefin was added to the reactor. Carbon monoxide and hydrogen (1:1) was pressured at 2700 p.s.i.g. into the reactor and the temperature raised to 100° C. An unsaturated mono-aldehyde was obtained in 68% yield. When a cobalt catalyst is used, the reaction leads to the formation of a saturated mono-aldehyde, and under special conditions a glycol, but it will not form the unsaturated aldehyde. The mono-aldehyde of the cyclopentadiene dimer which contains one double bond in the nucleus may be typified by the following formulae. The saturated compounds are those which are obtainable employing a cobalt catalyst.

With Rhodium

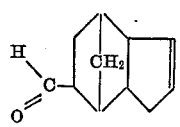

or

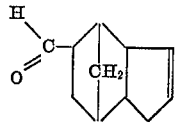

Unsaturated

With Colbalt

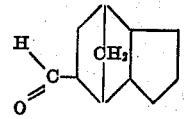

or

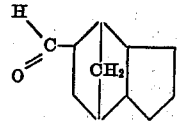

Saturated

The unsaturated aldehyde boiled at 96° C. at a pressure of 10 mm. of mercury and chemical analysis of the yield revealed:

| | Percent |
|---|---|
| Aldehyde, calculated at mol wt. 162 | 94.5 |
| Alcohol, calculated at mol wt. 164 | 5.5 |
| Unsaturation, calculated at mol wt. 162 | 100 |

The lower alkyl-substituted homologues such as methyl, ethyl, propyl, etc. of dicyclopentadiene react in the same manner to form the unsaturated aldehyde of said homologues by selectively oxonating one of the two double bonds. Thus this reaction may be expressed by the following equation.

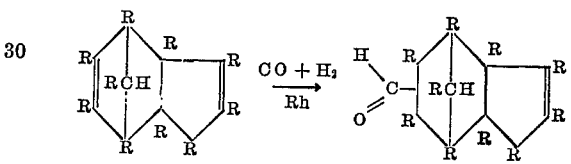

R represents hydrogen or a lower alkyl radical. The lower alkyl radicals may contain one, two or more carbon atoms and may be attached to any of the carbon atoms in the nucleus. These aldehydes can be reacted with alcohol in the presence of an acid catalyst to form an acetal. This acetal can then be oxonated further to form the aldehyde derivative. This in turn can be hydrolyzed to give the dialdehyde and subsequently reduced to form a glycol. Also the unsaturated mono-aldehyde of dicyclopentadiene may be reduced selectively to the unsaturated alcohol by the use of metal hydrides, which in turn may be oxonated further to form, after reduction, a glycol of dicyclopentadiene. In the preparation of an unsaturated aldehyde, the volume of diluent employed may vary between 1–6 volumes of diluent/volume of diolefin, preferably more than 2 volumes per volume of diolefin.

When major amounts of conventional cobalt catalyst are used in conjunction with minor amounts of the rhodium catalyst of this invention, high reaction rates and essentially the same product distribution, as compared to rhodium catalysis per se, are obtained as evidenced by the following table.

*Table III*

[Butene-1 as olefin feed. 3,500 p.s.i.g. $CO/H_2$ of 1/1. Rhodium is present as the sesquioxide and cobalt as the preformed carbonyl.]

| Temp., ° C. | Mole Percent Cat. | | Percent Branched Isomer | Relative Reaction Rate |
|---|---|---|---|---|
| | Rhodium | Cobalt | | |
| 105 | 0.05 | | 85 | 1 |
| 105 | | 1.6 | 30 | 0.15 |
| 105 | 0.005 | 1.6 | 80 | 0.85 |

Larger amounts of branched isomer may be obtained by operating at temperates below 105° C.

The ratio of cobalt catalyst to rhodium-containing catalyst may vary considerably; however, the preferred ratio is from about 100–1000 to 1. At low temperatures, e.g. <120° C., cobalt in amounts of 0.3–2 mole percent may be used with about 0.001–0.05% rhodium whereas at higher temperatures less cobalt and about 0.0005–0.003% rhodium are satisfactory to give fast reactions. Any of the aforementioned rhodium-containing catalysts may be used with any conventional cobalt-containing carbonylation catalyst.

It will be understood further that the foregoing examples have been given merely for purposes of illustration, and that other modifications of the present invention are possible without departing from the scope of the appended claims. The present process is amenable to the batch type, semi-continuous or continuous process, all of which are known in the art.

What is claimed is:

1. A process for producing oxygenated compounds by the reaction of an olefinic hydrocarbon compound, carbon monoxide and hydrogen which comprises reacting said olefinic compound with carbon monoxide and hydrogen at temperatures between about 60°–240° C. and pressures between about 1000–10,000 p.s.i.g., in the presence of a catalytic amount of a composition containing from 0.3 to 2 mole percent of cobalt containing catalyst and from 0.0005 to 0.05 mole percent rhodium-containing catalyst.

2. A process in accordance with claim 1 wherein the ratio of cobalt catalyst to rhodium catalyst is between 100 and 1,000/1.

3. A process in accordance with claim 1 wherein said temperatures are maintained less than 120° C., the cobalt catalyst in an amount from 0.3 to 2 mole percent and rhodium-containing catalyst in an amount of 0.001–0.05 mole percent.

References Cited in the file of this patent

UNITED STATES PATENTS

| | | |
|---|---|---|
| 2,327,066 | Roelen | Aug. 17, 1943 |
| 2,548,159 | Houtman et al. | Apr. 10, 1951 |
| 2,691,046 | Hasek | Oct. 5, 1954 |
| 2,694,730 | Ipatieff | Nov. 16, 1954 |
| 2,744,936 | Mertzweiller | May 8, 1956 |